(12) United States Patent  
Huberman et al.

(10) Patent No.: US 7,707,215 B1
(45) Date of Patent: Apr. 27, 2010

(54) PARIMUTUEL CONTENT PROVISIONING

(75) Inventors: Bernardo A. Huberman, Palo Alto, CA (US); Fang Wu, Union City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 476 days.

(21) Appl. No.: 11/550,355

(22) Filed: Oct. 17, 2006

Related U.S. Application Data

(60) Provisional application No. 60/808,652, filed on May 26, 2006.

(51) Int. Cl.
*G06F 17/30* (2006.01)
(52) U.S. Cl. .................................. 707/749; 707/754
(58) Field of Classification Search .............. 707/1, 707/9, 10, 100, 101, 102; 705/1, 7; 463/25, 463/28, 42; 717/102, 103
See application file for complete search history.

(56) References Cited

U.S. PATENT DOCUMENTS

| | | | |
|---|---|---|---|
| 6,450,887 B1 * | 9/2002 | Mir et al. ................... | 463/42 |
| 2007/0082730 A1 * | 4/2007 | Brown ....................... | 463/25 |

OTHER PUBLICATIONS

Edmund Eisenberg, and David Gale; Consensus of Subjective Probabilities: The Pari-Mutel Method; The Annals of Mathematical Statistics, vol. 30, No. 1, Mar. 1959, pp. 165-168.
Bram Cohen; Incentives Build Robustness in BitTorrent; May 22, 2003.
Llyod Shapley, and Martin Shubik; Trade Using One Commodity as a Means of Payment; The Journal of Political Economy, vol. 85, No. 5, Oct. 1977, pp. 937-968.
Richard H. Thaler, and William T. Ziemba; Anomallies: Parimutuel Betting Markets: Racetracks and Lotteries; The Journal of Economic Perspectives, vol. 2, No. 2, Spring 1988; pp. 161-174.
Saurabh Tewari, and Leonard Kleinrock; On Fairness, Optimal Download Performance and Proportional Replication in Peer-to-Peer Networks; Computer Science Department Univ. of Calif. Los Angeles, 2005; pp. 709-717.
Li Zhang; The Efficiency and Fairness of a Fixed Budget REsource Allocation Game; Hewlett-Packard Labs.
Gizmodo—The Gadgets Weblog; Rumor: OS X Leopard to Have BitTorrent Client for iTunes Store; http://gizmodo.com/gadgets/software/rumor-os-x-leopard-to-have-bittorent-client-for-itunes-store-17079...; May 1, 2006.
Slashdot-News for nerds, stuff that matters; Will OSX Build In Torrenting?; http://apple.slashdot.org/apple/06/05/01/174257.shtml; May 1, 2006.

* cited by examiner

*Primary Examiner*—Diane Mizrahi

(57) ABSTRACT

A parimutuel provision manager provides an efficient incentive mechanism for content provision on peer-to-peer systems. The parimutuel provision manager generates a wide diversity of content offerings while responding adaptively to customer demand. Files are served and paid for through a parimutuel market similar to that commonly used for betting in horse races. An analysis of the performance of such a system shows that there exists an equilibrium with a long tail in the distribution of content offerings, which guarantees the real time provision of any content regardless of its popularity.

20 Claims, 1 Drawing Sheet

PARIMUTUEL CONTENT PROVISIONING

CROSS-REFERENCE TO RELATED PATENT APPLICATION

This patent application claims priority under 35 U.S.C. §119 from U.S. provisional patent application No. 60/808,652 filed May 26, 2006 entitled "An Efficient and Adaptive System for Content Provision," with inventors Bernardo Huberman and Fang Wu, and which is hereby incorporated by reference.

TECHNICAL FIELD

This invention pertains generally to efficient serving of content, and more specifically to utilizing parimutuel methodology to provision content in a distributed network environment such that all content is made available regardless of popularity.

BACKGROUND

The provision of digitized content on-demand to millions of users presents a formidable challenge. With an ever increasing number of fixed and mobile devices with video capabilities, and a growing consumer base with different preferences, there is a need for a scalable and adaptive way of delivering a diverse set of files in real time to a worldwide consumer base.

These files should be accessible in such a way that the constraints posed by bandwidth and the diversity of demand is met without having to resort to client server architectures and specialized network protocols. This is addressed today by peer-to-peer networks, where each peer can be both a consumer and provider of a service. Peer-to-peer networks, unlike client server architectures, automatically scale in size as demand fluctuates. Furthermore, they are able to adapt to system failures. Examples of such systems are Bittorrent and Kazaa, which account for a sizable percentage of all the use of the Internet today. Furthermore, new services such as the British. Broadcasting Corporation Integrated Media Player show that it is possible to make media content available through a peer-to-peer system while still respecting digital rights.

However, providing such varied content presents a problem which peer-to-peer networks do not solve. Namely, as new content is created, the system ought to be able to swiftly respond to new demand on specific content, regardless of its popularity. This is a hard constraint on any distributed system, since providers with a finite amount of memory and bandwidth will tend to offer the most popular content, as is the case today with many peer-to-peer systems.

What is needed is an adaptable and efficient system and method, capable of robustly delivering any file, regardless of its popularity.

SUMMARY OF INVENTION

A parimutuel provision manager within a peer-to-peer system adaptably and efficiently delivers any file, regardless of its popularity. It does so by creating an incentive mechanism that ensures the existence of a diverse set of offerings which is in equilibrium with the available supply and demand, regardless of content and size. While the parimutuel provision manager delivers favorite mainstream content, it also provides files that are only of interest to small niche markets which only in the aggregate generate large revenues.

The parimutuel provision manager provides an efficient incentive mechanism for servers to store and serve files, thereby generating a wide diversity of content offerings while responding adaptively to customer demand. Files are served and paid for through a parimutuel market similar to that commonly used for betting on horse races. An analysis of the performance of such a system shows that there exists an equilibrium with a long tail in the distribution of content offerings, which guarantees the real time provision of any content regardless of its popularity. The bandwidth committed to a file by a server comprises that server's wager on the file. The files themselves correspond to the horses in a race, the downloads correspond to the races, and the current fraction of total bandwidth devoted to a file (a function of the file's current popularity) determines the "odds" on that file.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

Figure 1:
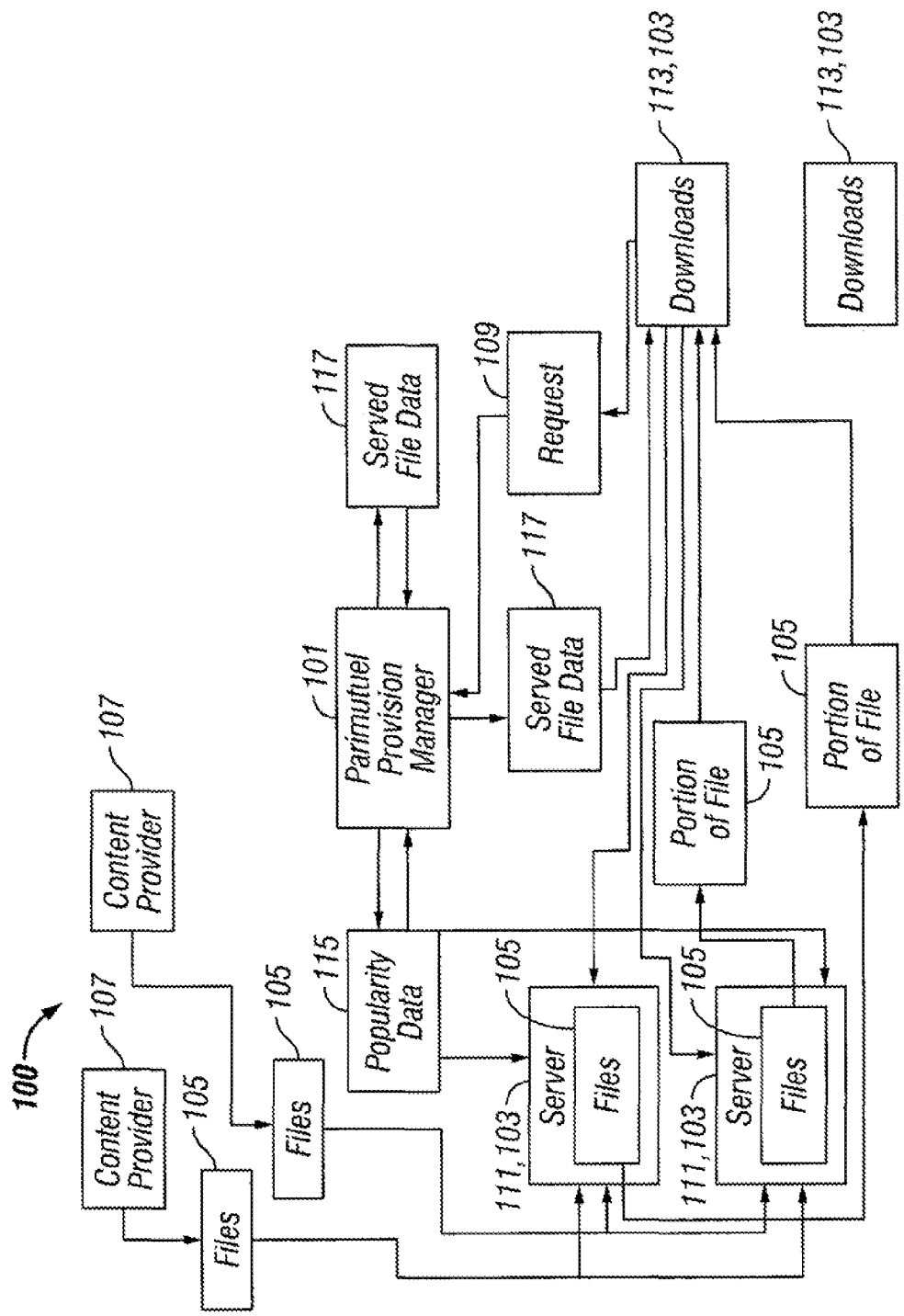
FIG. 1 is a block diagram illustrating a high level overview of a system for the operation of a parimutuel provision manager, according to one embodiment of the present invention.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

FIG. 1 illustrates an example of a peer-to-peer system 100 in which an embodiment of the present invention can operate. A parimutuel provision manager 101 provides incentives to a plurality of peers 103 to store and serve content 105 (e.g., files). Content providers 107 make files 105 available to the peers 103 to serve to other peers 103 in response to download requests 109. It is to be understood that in a peer-to-peer environment, a peer 103 can act as a server 111 or a downloader 113, and individual peers 103 typically act in both capacities. It is to be further understood that the files 105 can be digital representations of text, video, audio or any other format.

The parimutuel provision manager 101 maintains a listing 115 indicating the current popularity of files 105 available for download. The calculating of this popularity information by the parimutuel provision manager 101 is explained in detail below. The less popular a file 105, the greater the incentive that the parimutuel provision manager 101 provides for serving it. As explained in detail below, the payoff for successfully serving a requested file 105 is determined in a manor similar to a parimutuel horse racing market, with the bandwidth committed to a file 105 as a server's 111 "wager," the files 105 themselves corresponding to the horses in a race, the downloads Corresponding to the races, and the current fraction of total bandwidth devoted to a file 105 (a function of the file's 105 current popularity) determining the "odds" on that file 105.

Servers 111 consult the listing 115 of current "odds," and make decisions as to which files 105 to store and serve, and hence how much of their bandwidth to commit to which files 105. The parimutuel provision manager 101 keeps track of this information 117. Downloaders 113 send download requests 109 for desired files 105 to the parimutuel provision manager 101, which returns a list 117 of peers 103 serving that file 105 (in other embodiments the parimutuel provision manager 101 can publish this information, and the downloaders 113 can make their requests 109 directly to the servers 111). The downloader 113 then downloads the desired file 105 accordingly. Each server 111 that participated in the download provides the parimutuel provision manager 101 with proof of having served their portion (percentage) of the file 105. The parimutuel provision manager 101 charges the downloader 113 a fee, and calculates the division thereof to the various participating servers 111. The basis for the calculation of this division is parimutuel in nature, and is described in detail below. The parimutuel provision manager 101 also updates its current popularity listing 115 to indicate the download, as the download affects the popularity of the file 105.

It is to be understood that FIG. 1 illustrates an example of a system 100 on which an embodiment of the present invention can execute, but as will be apparent to those of ordinary skill in the relevant art, many variations on the system 100 are possible and are within the scope of the present invention. For example, the illustrated components can be distributed in other ways and/or can be centralized or localized. The various computing devices illustrated are only examples, and different, more, or fewer computing devices are utilized in other embodiments. Although a peer-to-peer network is illustrated and described, it is to be understood that the present invention can be applied in any network context in which multiple servers 111 can store and serve files 105, such that a download of a specific file 105 can be served by more than one server 111.

It to be understood that although the parimutuel provision manager 101 is illustrated as a single entity, as the term is used herein a parimutuel provision manager 101 refers to a collection of functionalities which can be implemented as software, hardware, firmware or any combination of these. Where a parimutuel provision manager 101 is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

To analyze the performance of such a system 100 according to one embodiment of the present invention, we first make a set of assumptions that are restrictive. We then relax these assumptions so as to make them correspond to a more realistic set of users. As shown below, in all these cases there exists an equilibrium in which the demand for any file 105 can be fulfilled by the parimutuel provision manager 101. Moreover this equilibrium exhibits a robust empirical anomaly which is responsible for generating a very long tail in the distribution of content offerings.

Consider a network-based file 105 exchange system 100 consisting of three types of traders: content provider 107, server 111, and downloader 113 (e.g., user). A content provider 107 supplies, typically at a fixed price per file 105, a repertoire of files 105 to a number of people acting as peers 103 or servers 111. Servers 111 then selectively serve a subset of those files 105 to downloaders 113 for a given price. In a peer-to-peer system 100, a downloader 113 can also, and often does, act as a server.

If the files 105 are typically large in size, a server 111 can only afford to store and serve a relatively small subset of files 105. The server 111 then faces the natural problem of choosing an optimal (from the point of view of maximizing his utility) subset of files 105 to store so as to sell them to downloaders 113.

Suppose that the system 100 charges each downloader 113 a flat fee for downloading any one file 105 (as per Apple's iTunes music store), which we normalize to one for clarity of discussion. Since many servers 111 can help distribute a single file 105, this unit of income has to be allocated to the servers 111 in ways that will incentivize them to always respond to a changing demand.

In order to do so, consider the case where there are m servers 111 and n files 105. Let $b_{ij}$ be the effective bandwidth of server i serving file j, normalized to $$\sum_{i,j} b_{ij} = 1. \qquad (1)$$

Also, denote the bandwidth fraction of file j by $$\pi_j = \sum_k b_{kj}. \qquad (2)$$

Suppose that when a downloader 113 starts downloading different parts of the file 105 simultaneously from all available servers 111 that have it. When it finishes downloading, it will have received a fraction of the file j $$q_{ij\infty} = \frac{b_{ij}}{\sum_k b_{kj}} = \frac{b_{ij}}{\pi_j} \qquad (3)$$

from server i. According to an embodiment of the present invention, the parimutuel provision manager 101 pays an amount $q_{ij}$ to server i as its reward for serving file j.

Now consider the case when server i's reserves an amount of bandwidth $b_{ij}$ as his "bid" on file j. Because we have normalized the total bandwidth and the total reward for serving one request 109 both to one, the proportional share allocation scheme described by Eq. (3) can be interpreted as redistributing the total bid to the "winners," in proportion to their bids. Thus, the payoff structure is similar to that of a parimutuel horse race betting market, where the $\pi_j$ can be regarded as the odds, the bandwidth corresponds to bettors, the files 105 to horses, and the requests 109 are analogous to races.

It is worth pointing out however, that in a real horse race all players who have placed a bet on the winning horse receive a share of the total prize, whereas in this embodiment of the present invention only those servers 111 that stored the "winning" file 105 and also had a chance to serve it get paid. In spite of this difference, when rewritten in terms of expected payoffs, the two mechanisms behave in similar fashion.

We now make three simplifying assumptions. While not necessarily realistic, they serve to set the framework that is utilized below to address more realistic scenarios. First, assume for now that every server 111 is rational in the sense that he chooses the optimal bandwidth allocation that maximizes his utility, whose explicit form will be given below.

Second, assume every server's allocation strategy is static, i.e., the $b_{ij}$'s are independent of time. Third, assume that each file j is requested randomly at a rate $\lambda_j > 0$ that does not change with time, and these rates are known to every server.

Consider a server i with the following standard additive form of utility:

$$U = E[\int_0^\infty e^{-\delta t} u(t) dt], \quad (4)$$

where u(t) is his income density at time t, and $\delta > 0$ is his future discount factor. Let $X_{j1}$ be the (random) time that file j is requested for the first time, let $X_{j2}$ be the time elapsed between the first request 109 and the second request 109, and so on. According to our parimutuel reward scheme, server i receives a lump-sum reward $b_{ij}/\pi_j$ from every such request 109, at times $X_{j1}$, $X_{j1}+X_{j2}$, etc. Thus the server i's total utility is given by $$U = \sum_j \frac{b_{ij}}{\pi_j} \sum_{i=1}^\infty E\left[e^{-\delta \sum_{k=1}^l X_{jk}}\right] \equiv \sum_j \frac{b_{ij}}{\pi_j} u_j. \quad (5)$$

The sum of expectations in Eq. (5) (denoted by $u_j$) can be calculated explicitly. Because the $X_{jk}$'s are independent identically-distributed random variables with density $\lambda_j^{-1} \exp(\lambda_j)$ we have $$u_j = E(e^{-\delta X_{j1}})\left(1 + \sum_{l=2}^\infty E\left[e^{-\delta \sum_{k=2}^l X_{jk}}\right]\right) \frac{\lambda_j}{\lambda_j + \delta}(1 + u_j). \quad (6)$$

Solving for $u_j$, we then find $$u_j = \frac{\lambda_j}{\delta}. \quad (7)$$

If we lets $\lambda = \Sigma_j \lambda_j$ be the total request rate and $p_j = \lambda_j/\lambda$ be the probability that the next request 109 asks for the file j, then we can also write $$u_j = \frac{\lambda}{\delta} p_j. \quad (8)$$

Plugging this back into Eq. (5), we obtain $$U = \frac{\lambda}{\delta} \sum_j \frac{p_j b_{ij}}{\pi_j}. \quad (9)$$

Since we assume that server i is rational, he will allocate $b_{ij}$ in a way that it solves the following optimization problem:

$$(b_{ij})_{j=1}^n \max_{\varepsilon R_1^V} \sum_j \frac{p_j b_{ij}}{\Sigma_k b_{kj}} \text{ subject to } \sum_j b_{ij} \leq b_i \quad (10)$$

Thus we see that the servers 111 play a finite budget resource allocation game. This type of game has been studied intensively, and a Nash equilibrium has been shown to exist under mild assumptions. In such an equilibrium, the players' utility functions are strongly competitive and in spite of a possibly large utility gap, the players behave in almost envy-free fashion (i.e., each player believes that that no other player has received more than they have).

we now relax some of the assumptions made above so as to address a more realistic case. It is typically difficult to discern the accurate request rate for a given file 105, especially at the early stages when there is no historical data available. Thus, it is better to assume that every server i holds a subjective belief about those request rates. Let $p_{ij}$ be server i's subjective probability that the next request 109 is for file j. Then server i believes that file j will be requested at a rate $\lambda_{ij} = \lambda_{pij}$. Eq. (10) then becomes $$(b_{ij})_{j=1}^n \max_{\varepsilon R_1^V} \sum_j \frac{\rho_{ij} b_{ij}}{\Sigma_k b_{kj}} \text{ subject to } \sum_j b_{ij} \leq b_i. \quad (11)$$

which is still a finite budget resource allocation game as considered above.

It is interesting to note that when m is large, $b_{ij}$ is small compared to $\pi_j \Sigma_k b_{kj}$, so that $\pi_j$ can be treated as a constant. In this case, the optimization problem can be well approximated by $$(b_{ij})_{j=1}^n \max_{\varepsilon R_1^V} \sum_j \frac{\rho_{ij} b_{ij}}{\pi_j} \text{ subject to } \sum_j b_{ij} \leq b_i \quad (12)$$

Thus, server i should use all his bandwidth to serve those files 105 j with the largest ratio $p_{ij}/\pi_j$.

This scenario (12) corresponds to the so-called parimutuel consensus problem, which has been studied in detail. In this problem a certain probability space is observed by a number of individuals, each of which endows it with their own subjective probability distributions. The issue then is how to aggregate those subjective probabilities in such a way that they represent a good consensus of the individual ones. The parimutuel consensus scheme is similar to that of betting on horses at a race, the final odds on a given horse being proportional to the amount bet on the horse. As has been shown by Eisenberg and Gale, an equilibrium then exists such that the bettors as a group maximize the weighted sum of logarithms of subjective expectations, with the weights being the total bet on each horse.

Moreover a number of empirical studies of parimutuel markets have shown that such markets do indeed exhibit a high correlation between the subjective probabilities of the bettors and the objective probabilities generated by the racetracks. Equally interesting is the existence of a robust empirical anomaly called the favorite-longshot bias. The anomaly shows that favorites win more frequently than the subjective probabilities imply, and longshots less often. Besides implying that favorites are better bets than long shots, this anomaly ensures the existence of the long tail, populated by those files 105 which, while not singly popular, in aggregate are responsible for a large amount of the traffic in the system 100.

We now consider the case where the rate at which files 105 are requested can change with time. Because of this, each server 111 has to actively adjusts its bandwidth allocation to adapt to such changes. As we have seen above, server i has an incentive to serve those files 105 with large values of $p_{ij}/\pi_j$. Recall that $\pi_j(t)$ is just the fraction of total bandwidth spent to serve file j at time t, which can be estimated from information tracked by the parimutuel provision manager 101. The parimutuel provision manager 101 makes current information 115 concerning file 105 popularity (i.e., the real-time $\pi_j$ for each file 105) available to all servers 111, so as to help them decide on how to adjust their own allocations of bandwidth.

From Eq. (3) we see that, by serving file j, server i's expected per bandwidth earning from the next request 109 is $$\frac{p_j q_{ij}}{b_{ij}} = \frac{p_j}{\pi_j}. \tag{13}$$

Hence a server 111 benefits most by serving those files 105 with the largest "p/π ratio". However, as soon as a given server 111 starts serving file j, the corresponding p/π ratio decreases. As a consequence, the system 100 self-adapts to the limit of uniform p/π ratios. If the system 100 is perfectly efficient, we would expect that $$\frac{p_i}{\pi_j} = \text{constant}. \tag{14}$$

Because $p_j$ and $\pi_j$ both sum up to one, this implies that $$\pi_j = p_j \tag{15}$$

or $$\sum_k b_{kj} = \frac{\lambda_j}{\lambda} \alpha \lambda_j k. \tag{16}$$

In other words, the total bandwidth used to serve a file 105 is proportional to the file's 105 request rate.

This result has interesting implications when considering the social utility of the downloaders 113. Tewari and Kleinrock have shown that in a homogeneous network the average download time is minimized when $$\sum_k b_{kj} = \frac{\lambda_j}{\lambda} \alpha \lambda_j k.$$

This implies that in the perfectly efficient limit, the parimutuel provision manager 101 maximizes the social utility of the downloaders 113, which is measured by their average download times.

Since in reality a market is never perfectly efficient, the above analysis only makes sense if the characteristic time it takes for the system 100 to relax back to uniformity from any disturbance is short. As a concrete example, consider a new file j released at time 0, being shared by only one server. Suppose that every downloader 113 starts sharing his piece of the file 105 immediately after downloading it. Because there are initially few servers 111 serving the file 105 but many downloaders 113 requesting the file 105, for very short times afterwards the upload bandwidth will be fully utilized. That is, during time dt, an amount $\pi_j(t)dt$ of data is downloaded and added to the total upload bandwidth immediately. Hence we have $$d\pi_j(t) = \pi_j(t)dt. \tag{17}$$

So we see that $\pi_j(t)$ grows exponentially until $\pi_j(T) \sim p_j$. Solving out T, we find $$T \sim \log\left(\frac{p_j}{\pi_j(0)}\right). \tag{18}$$

Thus the system 100 reaches uniformity in logarithmic time, a signature of its high efficiency.

This discussion has so far assumed that all servers 111 are rational, so that they will actively seek those files 105 that are most under-supplied so as to serve them to downloaders 113. In reality however, while some servers 111 do behave rationally, a lot of others do not This is because even a perfectly rational server 111 sometimes can make wrong decisions as to which files 105 to store because his subjective probability estimate of what is in demand can be inaccurate. Also, such a bounded-rational server 111 can at times be too lazy to adjust his bandwidth allocation, so that he simply keeps serving his current offerings. At other times he might simply imitate the behavior of other servers 111 by choosing to serve what they believe to be the most popular files 105.

As a simple example, assume there are only two files 105, A and B. Let $p=\lambda_A/\lambda$ be file A's real request 109 probability, and let 1−p be file B's real request 109 probability. Suppose the servers 111 are divided into two classes, with α fraction rational and 1−α fraction irrational, arriving one by one in a random order. Each rational server's subjective probability in general can be described by an identically distributed random variable $P_t \in [0, 1]$ with mean p. Then with probability $P[P_t > \pi(t)]$ he will serve file A, and with probability $P[P_t < \pi(t)]$ he will serve file B. In order to carry out some explicit calculation below, we consider the simplest choice of $P_t$, namely a Bernoulli variable $$P[P_1=1]=p, P[P_1=0]=1-p. \tag{19}$$

Clearly $E[P_1]=p$, so the subjective probabilities are accurate on average. Given this choice a rational server 111 chooses A with probability p and B with probability 1−p.

On the other hand, consider the situation where an irrational server 111 chooses an existing server 111 at random and copies that server's bandwidth allocation. That is, with probability $\pi(t)$ an irrational server 111 will choose file A. This assumption can also be interpreted as follows. Suppose a downloader 113 starts serving his files 105 immediately after downloading them, but never initiates to serve a file 105 it has not downloaded anyway. (This is the way a non-seed peer 103 behaves within Bittorrent.) Then the probability that he will serve file j is exactly the probability that he just downloaded file j, which is $\pi_j(t)$.

From these two assumptions we see that $$P[\text{server } t \text{ serves } A] = \alpha p + (1-\alpha)\pi(t), \tag{20}$$

and $$P[\text{server } t \text{ serves } B] = \alpha(1-p) + (1-\alpha)(1-\pi(t)). \tag{21}$$

The stochastic process described by the above two equations has been recently studied in the context of choices among technologies for which evidence of their value is equivocal, inconclusive, or even nonexistent. As has been shown, the dynamics generated by such equations leads to outcomes that appear to be deterministic in spite of being governed by a stochastic process. In the context of the present invention this means that when the objective evidence for the choice of a particular file 105 is very weak, any sample path of this process quickly settles down to a fraction of files 105 downloaded that is not predetermined by the initial conditions: ex ante, every outcome is just as (un)likely as every other. Thus under that condition one cannot ensure an equilibrium that is both optimum and repeatable. In the opposite case, when the objective evidence is strong, the process settles down to a value that is determined by the quality of the evidence. In both cases the proportion of files 105 downloaded never settles into either zero or one.

In the general case that we have been considering, there are typically a number of servers 111 that will behave in bounded rational fashion, and a few that are perfectly rational. Specifically, when $\alpha>0$, which corresponds to the case where a small number of servers 111 are rational, the $\pi(t)$ will converge to p in the long time limit. That is, a small fraction of rational servers 111 is enough for the system 100 to reach an optimum equilibrium. However, it is worth pointing out that since the characteristic convergence time diverges exponentially in $1/\alpha$, the smaller the value of alpha $\alpha$, the longer it will take for the system 100 to reach such an optimum state.

As will be understood by those familiar with the art, the invention may be embodied in other specific forms without departing from the spirit or essential characteristics thereof. Likewise, the particular naming and division of the modules, agents, managers, functions, procedures, actions, layers, features, attributes, methodologies and other aspects are not mandatory or significant, and the mechanisms that implement the invention or its features may have different name divisions and/or formats. Furthermore, as will be apparent to one of ordinary skill in the relevant art, the modules, agents, managers, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer implemented method for provisioning content, the method comprising the steps of:

maintaining real-time popularity information for a plurality of files available for download, such that this information can be accessed by a plurality of servers;

maintaining information concerning which of the plurality of servers are storing which of the plurality of files, such that this information can be accessed by a plurality of downloaders;

receiving, at a computer processor, information from each server of the plurality that served a percentage of a file to a downloader, said information proving provision of the percentage of the file; and in response to serving out all or a portion of the file from one or more of the servers to the downloader, dividing a fee from the downloader for the file among each server of the plurality that served a percentage of the file to the downloader according to a parimutuel model taking into account real-time popularity information for the file roles of participating servers in providing the file to the downloader.

2. The method of claim 1, wherein maintaining information concerning which of the plurality of servers are storing which of the plurality of files such that this information can be accessed by each of a plurality of downloaders further comprises:

receiving requests from downloaders to download files of the plurality; and responsive to each received request, returning information to the requesting downloader concerning which of the plurality of servers are storing the requested file.

3. The method of claim 1, wherein maintaining information concerning which of the plurality of servers are storing which of the plurality of files further comprises:

maintaining information concerning percentages of bandwidth of each server of the plurality committed to individual files.

4. The method of claim 3, wherein maintaining information concerning percentages of bandwidth of each server of the plurality committed to individual files further comprises:

periodically receiving updates from servers indicating changes made to percentages of bandwidth committed to individual files; and updating the maintained information to indicate the changes.

5. The method of claim 1, wherein dividing a fee from the downloader for the file among each server of the plurality that served a percentage of the file to the downloader according to a parimutuel model further comprises:

treating the real-time popularity information for the file as odds on that file;

treating a percentage of bandwidth of each participating server committed to the file as that server's wager;

treating the percentage of the file provided to the downloader by each participating server as that server's finishing position; and calculating each participating server's payout in a parimutuel manner as a function of the odds, the server's wager and the server's finishing position.

6. The method of claim 1, further comprising:

updating real-time popularity information concerning a downloaded file to account for the download.

7. The method of claim 1 wherein maintaining real-time popularity information for a plurality of files available for download further comprises:

maintaining, for each file of the plurality, information concerning a total current fraction of server bandwidth devoted to that file.

8. At least one computer readable storage medium containing a computer program product in the form of program instructions which when executed by a computer system cause the computer system to perform a method for provisioning content, the method comprising:

program code for maintaining real-time popularity information for a plurality of files available for download, such that this information can be accessed by a plurality of servers;

program code for maintaining information concerning which of the plurality of servers are storing which of the plurality of files, such that this information can be accessed by a plurality of downloaders;

program code for receiving at a computer processor information from each server of the plurality that served a percentage of a file to a downloader, said information proving provision of the percentage of the file; and program code for dividing a fee from the downloader for the file in response to serving out all or a portion of the file from one or more of the servers to the downloader, such that said fee is divided among each server of the plurality that served a percentage of the file to the downloader according to a parimutuel model taking into account real-time popularity information for the file roles of participating servers in providing the file to the downloader.

9. The computer readable storage medium of claim 8, wherein the program code for maintaining information concerning which of the plurality of servers are storing which of the plurality of files such that this information can be accessed by each of a plurality of downloaders further comprises:

program code for receiving requests from downloaders to download files of the plurality; and program code for responsive to each received request, returning information to the requesting downloader concerning which of the plurality of servers are storing the requested file.

10. The computer readable storage medium of claim 8, wherein the program code for maintaining information concerning which of the plurality of servers are storing which of the plurality of files further comprises:

program code for maintaining information concerning percentages of bandwidth of each server of the plurality committed to individual files.

11. The computer readable storage medium of claim 10, wherein the program code for maintaining information concerning percentages of bandwidth of each server of the plurality committed to individual files further comprises:

program code for periodically receiving updates from servers indicating changes made to percentages of bandwidth committed to individual files; and program code for updating the maintained information to indicate the changes.

12. The computer readable storage medium of claim 8, wherein the program code for dividing a fee from the downloader for the file in response to serving out all or a portion of the file from one or more of the servers to the downloader, such that said fee is divided among each server of the plurality that served a percentage of the file to the downloader according to a parimutuel model further comprises:

program code for treating the real-time popularity information for the file as odds on that file;

program code for treating a percentage of bandwidth of each participating server committed to the file as that server's wager;

program code for treating the percentage of the file provided to the downloader by each participating server as that server's finishing position; and program code for calculating each participating server's payout in a parimutuel manner as a function of the odds, the server's wager and the server's finishing position.

13. The computer readable storage medium of claim 8, further comprising:

program code for updating real-time popularity information concerning a downloaded file to account for the download.

14. The computer readable storage medium of claim 8 wherein the program code for maintaining real-time popularity information for a plurality of files available for download further comprises:

program code for maintaining, for each file of the plurality, information concerning a total current fraction of server bandwidth devoted to that file.

15. A computer system for provisioning content, the computer system comprising:

a portion configured to maintain real-time popularity information for a plurality of files available for download, such that this information can be accessed by a plurality of servers;

a portion configured to maintain information concerning which of the plurality of servers are storing which of the plurality of files, such that this information can be accessed by a plurality of downloaders;

a portion communicatively coupled with the plurality of servers, wherein each of the plurality of servers is configured to provide providing all or a portion of said files for access by said downloaders;

a portion configured to receive, at a computer processor, information from each server of the plurality that served a percentage of a file to a downloader, said information proving its provision of the percentage of the file; and a portion configured to divide a fee from the downloader for the file among each server of the plurality that served a percentage of the file to the downloader according to a parimutuel model taking into account real-time popularity information for the file roles of participating servers in providing the file to the downloader.

16. The computer system of claim 15, wherein the portion configured to maintain information concerning which of the plurality of servers are storing which of the plurality of files such that this information can be accessed by each of a plurality of downloaders further comprises:

a portion configured to receive requests from downloaders to download files of the plurality; and a portion configured to, responsive to each received request, return information to the requesting downloader concerning which of the plurality of servers are storing the requested file.

17. The computer system of claim 15, wherein the portion configured to maintain information concerning which of the plurality of servers are storing which of the plurality of files further comprises:

a portion configured to maintain information concerning percentages of bandwidth of each server of the plurality committed to individual files.

18. The computer system of claim 17, wherein the portion configured to maintain information concerning percentages of bandwidth of each server of the plurality committed to individual files further comprises:

a portion configured to periodically receive updates from servers indicating changes made to percentages of bandwidth committed to individual files; and a portion configured to update the maintained information to indicate the changes.

19. The computer system of claim 15, wherein the portion configured to divide the fee from the downloader for the file among each server of the plurality that served a percentage of the file to the downloader according to a parimutuel model further comprises:

a portion configured to treat the real-time popularity information for the file as odds on that file;

a portion configured to treat a percentage of bandwidth of each participating server committed to the file as that server's wager;

a portion configured to treat the percentage of the file provided to the downloader by each participating server as that server's finishing position; and a portion configured to calculate each participating server's payout in a parimutuel manner as a function of the odds, the server's wager and the server's finishing position.

20. The computer system of claim 15, further comprising:

a portion configured to update real-time popularity information concerning a downloaded file to account for the download.

\* \* \* \* \*

UNITED STATES PATENT AND TRADEMARK OFFICE
CERTIFICATE OF CORRECTION

PATENT NO. : 7,707,215 B1 Page 1 of 1
APPLICATION NO. : 11/550355
DATED : April 27, 2010
INVENTOR(S) : Bernardo A. Huberman et al.

It is certified that error appears in the above-identified patent and that said Letters Patent is hereby corrected as shown below:

In column 12, line 31, in Claim 15, after "proving" delete "its".

Signed and Sealed this

Fifth Day of October, 2010

David J. Kappos
*Director of the United States Patent and Trademark Office*